(12) United States Patent
Heikkilä

(10) Patent No.: US 7,352,220 B2
(45) Date of Patent: Apr. 1, 2008

(54) MEASURING AVERAGE OF PHASE VOLTAGE OF A FREQUENCY CONVERTER BASED ON AN IDEALIZED WAVEFORM

(75) Inventor: Samuli Heikkilä, Helsinki (FI)

(73) Assignee: ABB Oy, Helsinki (FI)

( * ) Notice: Subject to any disclaimer, the term of this patent is extended or adjusted under 35 U.S.C. 154(b) by 122 days.

(21) Appl. No.: 11/350,933

(22) Filed: Feb. 10, 2006

(65) Prior Publication Data

US 2006/0226803 A1    Oct. 12, 2006

(30) Foreign Application Priority Data

Feb. 11, 2005   (FI) .................................. 20055061

(51) Int. Cl.
*H03K 3/017*    (2006.01)
*H03K 5/04*     (2006.01)
*H03K 7/08*     (2006.01)

(52) U.S. Cl. ...................... 327/175; 327/172; 327/176; 363/137

(58) Field of Classification Search ................ 327/175, 327/172, 176

See application file for complete search history.

(56) References Cited

U.S. PATENT DOCUMENTS

| | | | |
|---|---|---|---|
| 4,547,719 A | 10/1985 | Sakamoto et al. | |
| 5,045,800 A * | 9/1991 | Kung | ........................ 327/176 |
| 6,288,595 B1 | 9/2001 | Hirakata et al. | |
| 2001/0050540 A1 | 12/2001 | Takayama et al. | |

FOREIGN PATENT DOCUMENTS

| | | |
|---|---|---|
| JP | 02307369 | 12/1990 |
| JP | 05103473 | 4/1993 |
| JP | 09 154294 A | 6/1997 |
| JP | 10075586 | 3/1998 |
| JP | 2004 173360 A | 6/2004 |

OTHER PUBLICATIONS

Frede Blaabjerg, Improved Modulation Techniques for PWM—VSI Drives, IEEE Transactions on Industrial Electronics, Feb. 1997, pp. 87-95, vol. 44, No. 1.
Finnish Search Report.

* cited by examiner

*Primary Examiner*—Bao Q. Vu
*Assistant Examiner*—Johali A Torres Ruiz
(74) *Attorney, Agent, or Firm*—Buchanan Ingersoll & Rooney PC (57) ABSTRACT

A method and arrangement for determining the effective time of a voltage pulse of phase voltage generated by a frequency converter provided with an intermediate voltage circuit, the voltage pulses of the phase voltage being generated from the upper and lower voltage levels ($U_{DC}$, 0) of the intermediate voltage circuit, the voltage levels showing a difference in potential ($U_{DC}$). The method includes generating a first reference voltage ($U_{ref1}$) and a second reference voltage ($U_{ref2}$); scaling the phase output voltage by the scaling coefficient (k); comparing the low-pass filtered phase output voltage with the first reference voltage ($U_{ref1}$); detecting a time instant ($t_1$) when the low-pass filtered phase output voltage exceeds the first reference voltage ($U_{ref1}$); comparing the low-pass filtered phase output voltage with the second reference voltage ($U_{ref2}$); detecting a time instant ($t_2$) when the low-pass filtered phase output voltage is lower than the second reference voltage ($U_{ref2}$); and calculating the effective time of the voltage pulse on the basis of the time between the first and the second time instants and a constant term.

21 Claims, 6 Drawing Sheets

MEASURING AVERAGE OF PHASE VOLTAGE OF A FREQUENCY CONVERTER BASED ON AN IDEALIZED WAVEFORM

BACKGROUND OF THE INVENTION

The invention relates to a method and arrangement according to the preambles of the independent claims for measuring commutation delay of a frequency converter.

Methods based on frequency conversion for controlling electronic machines usually aim at making the output voltage of the frequency converter correspond to a specific reference value set for torque, flux, frequency, or other the like. The preset voltage value may therefore originate from a current or scalar controller, for example, in which case the lowest control loop is always a voltage controller. Although an actual voltage controller is not always needed, for example in methods based on direct torque control, also in these cases the realized value of average voltage should be known as precisely as possible to allow the machine to be controlled in an optimal manner. Consequently, good performance in motor control usually requires proper voltage feedback coupling.

Figure 1:
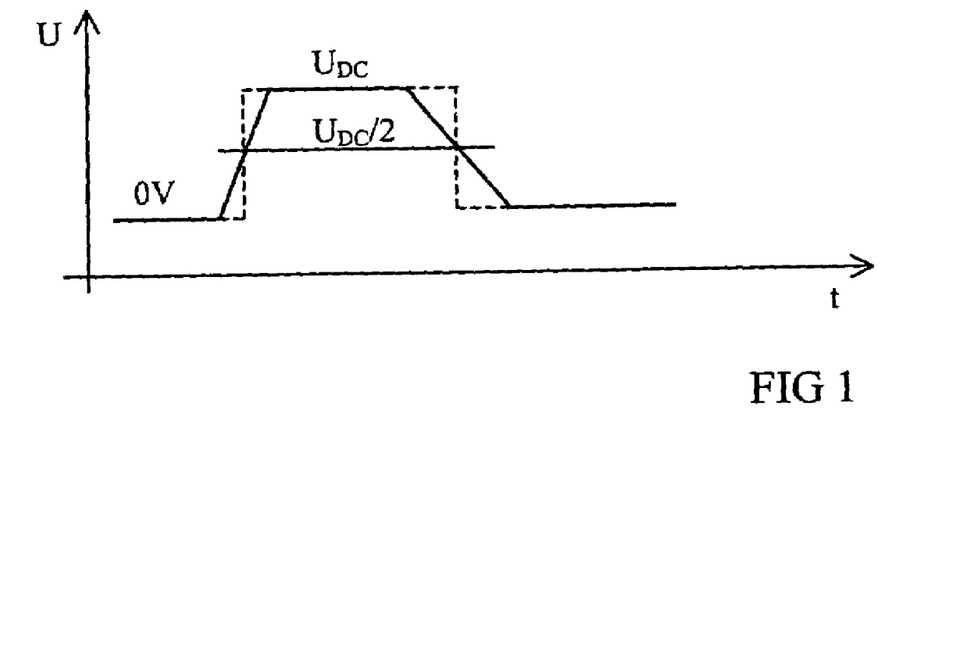
FIG. 1 illustrates a prior art solution for phase voltage comparison in connection with an ideal voltage pulse.

An instantaneous output voltage of a frequency converter is usually derived on the basis of switch position and a measured intermediate circuit voltage. However, the magnitude of an average output voltage depends on the real lengths of phase-specific voltage pulses, which may vary depending on the duration of the dead time. Pulse length must therefore be measured to eliminate the impact of dead time. The measurement is usually carried out using a comparator circuit that compares the phase voltage with a half of a DC voltage, for example. The calculation provides the correct average voltage value provided that the real voltage changes linearly (or extremely rapidly) during the rising and falling edge. This situation is illustrated in FIG. 1, in which the area of the real voltage pulse corresponds to the signal generated by a comparator (broken line).

Figure 2:
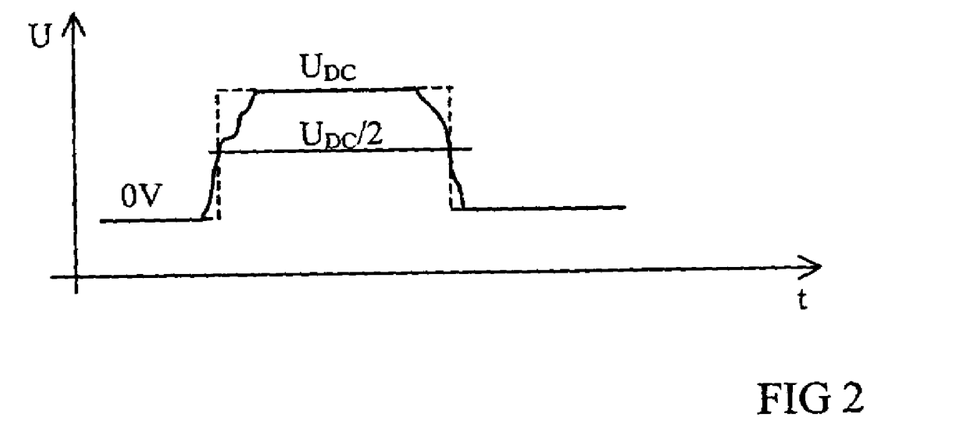
FIG. 2 illustrates a prior art solution for phase voltage comparison in connection with an irregular voltage pulse.

In practice voltage change is not always linear during changes in switch position. This problem arises particularly when commuting phase current is close to zero, in which case voltage change may be extremely vague. Comparison of output voltage on the basis of a half of a DC voltage may therefore lead to a considerable error in the interpretation of the pulse length. For example in the case illustrated in FIG. 2 the area of the real voltage pulse is clearly smaller than what could be expected on the basis of the signal (broken line) generated by the comparator.

In other words, comparison of instantaneous phase voltage is not always reliable for making conclusions on the magnitude of average output voltage. In practice this can be detected as a sixth harmonic wave in torque when driving at a low speed (<30 rpm), in which the shaft movement is often jerky so that it is visible to the eye if the speed controller has not been tuned tight. Problem spots, i.e. sector changes in which the current of some phase drops to zero for a moment, are clearly visible on the shaft.

The problem associated with phase voltage comparison is naturally aggravated when switching frequency is increased. This means that if voltage feedback is based on the above-disclosed conventional method of comparison, a lower performance of motor control must be accepted at higher switching frequencies (>8 kHz).

This problem in comparison could be avoided by measuring average phase voltage by means of analog integrators and AD converters, for example. However, in this solution problems arise from the price and the offset and gain errors of the analog components.

A number of methods have been proposed to resolve or to reduce the effects the above problem known from before. U.S. Pat. No. 5,206,802, for example, discloses a method and device for dead-time compensation in switch components. According to this method, a separate voltage required for the compensation is calculated and added to a voltage reference.

U.S. Pat. No. 4,547,719, in turn, discloses the measuring of output voltages of an inverter, these voltages being used for creating a feedback signal to compensate for dead time.

A problem with the prior art solutions is their complexity and the costs increase arising from the measurements and the feedback couplings.

BRIEF DESCRIPTION OF THE INVENTION

It is an object of the invention to provide a method and arrangement that avoid the above drawbacks and allow instantaneous phase voltage to be determined reliably and without expensive components.

This is achieved by a method and device according to the invention, characterized by what is disclosed in the characterizing parts of independent claims 1 and 8. The preferred embodiments of the invention are disclosed in the dependent claims.

The basic idea of the invention is to measure with precision the length of an imaginary voltage pulse having a magnitude corresponding to that of DC voltage, an area corresponding to that of a real voltage pulse, and infinitely fast rise and fall times. On the basis of the voltage pulse length thus measured and the magnitude of the DC voltage, it is then possible to calculate the precise average of the real phase voltage in all situations. The invention employs simple and affordable analog components to transform the measurement of a voltage pulse time integral into a measurement of time that is simple to implement digitally.

The invention provides a simple method and device that enable the precise average of the phase voltage to be reliably determined in all situations and operational states.

BRIEF DESCRIPTION OF THE INVENTION

In the following the invention will be described in greater detail with reference to the preferred embodiments and the accompanying drawings, in which.

DETAILED DESCRIPTION OF THE INVENTION

Figure 3:
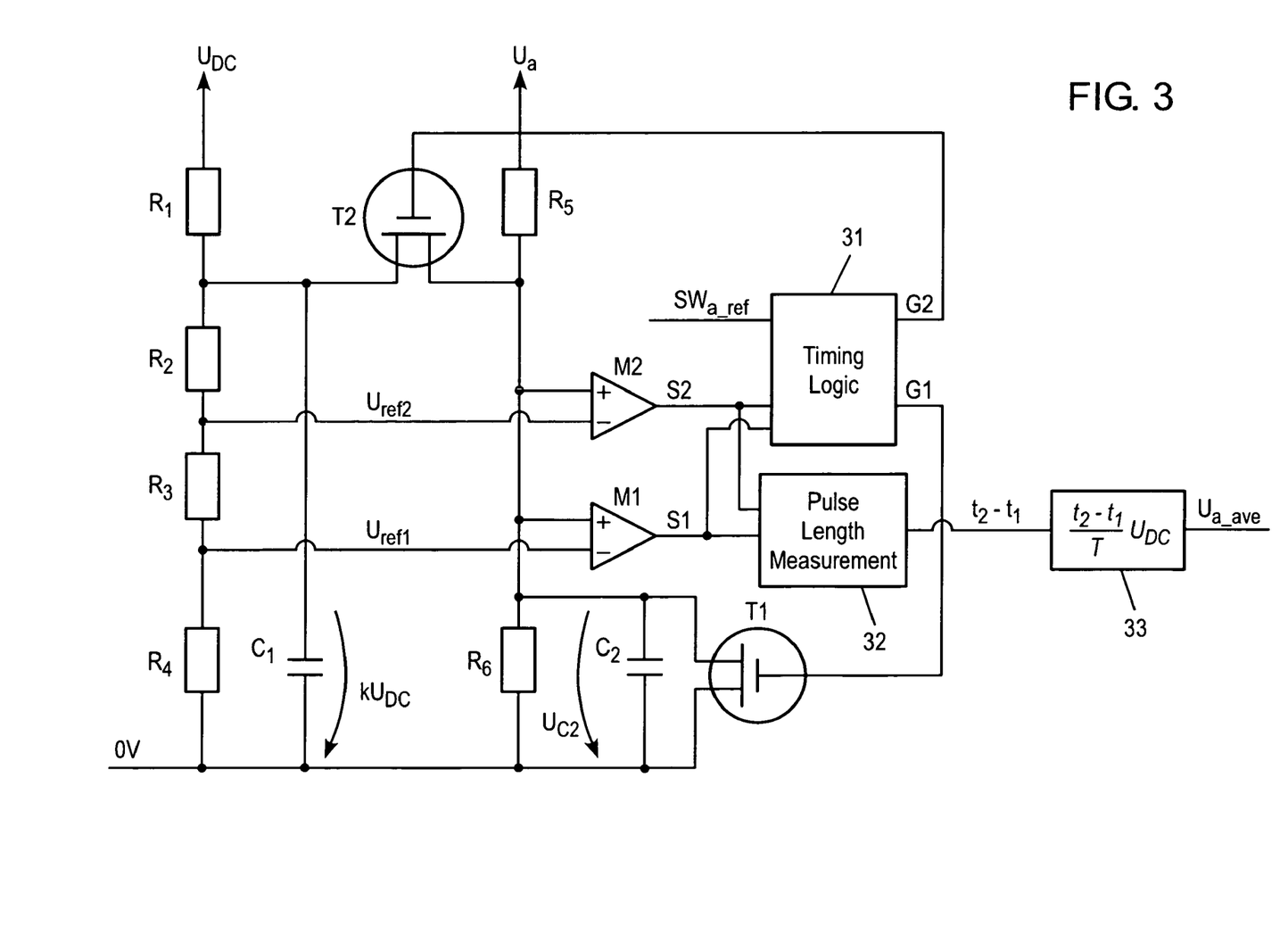
FIG. 3 is a schematic illustration of circuit that implements the method of the invention.

The circuit shown in FIG. 3 is a schematic illustration of the operation of the method and arrangement of the invention. The circuit of FIG. 3 is based on a measurement carried out at the potential of the lower voltage level (0V), i.e. the negative rail, of a DC intermediate circuit, the voltage of the DC intermediate circuit, i.e. DC voltage $U_{DC}$ and phase voltages $U_a$ being scaled in the measurement by using resistors $R_1 \ldots R_6$ to obtain the same scaling coefficient for both voltages, i.e.

$$\frac{R_2 + R_3 + R_4}{R_1 + R_2 + R_3 + R_4} = \frac{R_6}{R_5 + R_6}.$$

In other words, if phase voltage $U_a$ and intermediate circuit voltage $U_{DC}$ were equal, the voltage at points between the first resistance $R_1$ and the second resistance $R_2$ and between the fifth resistance $R_5$ and the sixth resistance $R_6$, respectively, would be equal as well. As stated, this scaling is carried out as illustrated in FIG. 3 by means of a resistive voltage divider. It should be noted that for the sake of clarity FIG. 3 only shows a single-phase circuit. However, it is obvious that a similar circuit can be made in each phase.

Let k be the scalar coefficient, whereby $$k = \frac{R_6}{R_5 + R_6}$$

Figure 4:
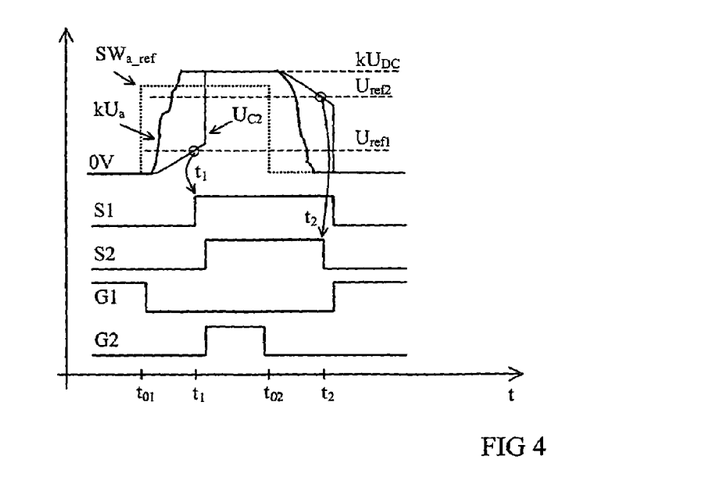
FIG. 4 is a signal diagram of the operation of the circuit of FIG. 3.

FIG. 4 is a signal diagram illustrating the functioning of the circuit. At first switching reference $SW_{a\_ref}$ controlling a switch component of the output of phase a shown in FIG. 3 is at zero and transistor T1 has been brought to a conducting state by a control signal G1 (G1>0) generated by a timing logic circuit, the voltage of capacitor $C_2$ thus being zero. At a time instant $t_{01}$ switching reference $SW_{a\_ref}$ changes its state, thereby controlling the output switch component of phase a to a conductive state, while at the same time the timing logic circuit controls transistor T1 to a non-conductive state (G1=0). Next, phase voltage $U_a$ begins to grow, causing capacitor $C_2$ to start to recharge according to a time constant formed by resistors $R_5$ and $R_6$ and capacitor $C_2$.

At time instant $t_1$ voltage $U_{C2}$ reaches a lower reference voltage $U_{ref1}$ thereby causing output S1 of a comparator member, such as comparator M1, to go over from zero to its maximum value. In this situation the following is valid for reference voltage $U_{ref1}$:

$$U_{ref1} = \frac{1}{C_2} \int_{t_{01}}^{t_1} \frac{kU_a - U_{C2}}{R} dt, \tag{1}$$

where R represents a resistance equal to the resistance of the fifth resistance $R_5$ and the sixth resistance $R_6$ coupled in parallel, i.e.

$$R = \frac{R_5 R_6}{R_5 + R_6}$$

When resistors $R_2$, $R_3$, and $R_4$ and capacitor $C_2$ are chosen such that $U_{ref1} << kU_{DC}$ and $RC_2 >> t_1 - t_{01}$ and phase voltage changes during time interval $t_{01} \ldots t_1$, the capacitor voltage is considerably lower than $kU_a$, and equation (1) can be used for the following approximation;

$$U_{ref1} = \frac{k}{RC_2} \int_{t_{01}}^{t_1} U_a dt \tag{2}$$

Thus the phase voltage integral obtained for time interval $t_{01} \ldots t_1$ is $$\int_{t_{01}}^{t_1} U_a dt = \frac{RC_2 U_{ref1}}{k} \tag{3}$$

Figure 5:
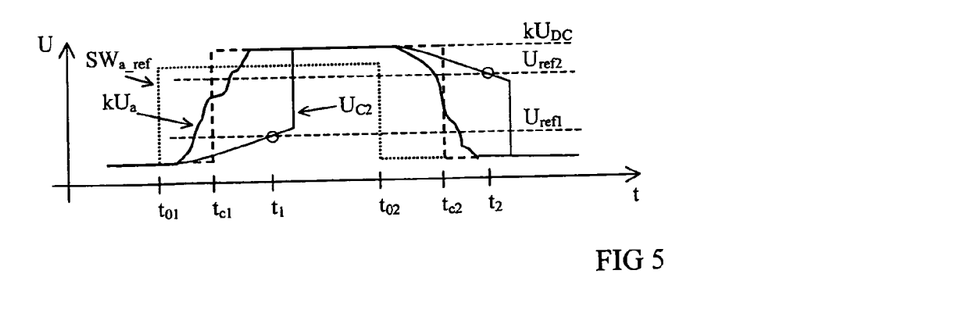
FIG. 5 illustrates a comparison between an ideal voltage pulse and a real one.

Assume that the ideal voltage pulse corresponding to the real phase voltage and having a DC voltage amplitude, starts at time instant $t_{c1}$ (FIG. 5). In order for the ideal and the real voltage pulses to have equal areas during time interval $t_{01} \ldots t_1$, on the basis of equation (3) the following must be valid for time instant $t_{c1}$:

$$U_{DC}(t_1 - t_{c1}) = \int_{t_{01}}^{t_1} U_a dt = \frac{RC_2 U_{ref1}}{k},$$

and thereby $t_{c1}$ is expressed as $$t_{c1} = t_1 - \frac{RC_2 U_{ref1}}{kU_{DC}} = t_1 - \frac{R_4}{R_2 + R_3 + R_4} RC_2 \tag{4}$$

In other words, for calculating the rising instant $t_{c1}$ of the ideal voltage pulse, it suffices to measure time instant $t_1$ of the rising edge of comparator signal S1, $t_{c1}$ being then obtained by subtracting from this time instant a constant dependent on the switching component values.

For calculating the falling edge, capacitor $C_2$ must first be recharged preferably to a value corresponding to the DC voltage, i.e. to comparison value $kU_{DC}$. The voltage of capacitor $C_2$, i.e. low-pass filtered scaled phase voltage $U_{C2}$, assumes this value automatically provided that the voltage pulse is sufficiently long compared with time constant $RC_2$ of the low-pass filter functioning as an integrator. In practice, however, the minimum pulse lengths are often too small to allow this permanent state value of $U_{C2}$ to be achieved with sufficient precision after each change in the phase output switch position. This is why the initialisation is usually needed. According to an embodiment of the invention it is carried out by controlling transistor T2 to a conductive state by means of grid reference G2 after time instant $t_1$, before the next falling edge.

It is to be noted that capacitor $C_1$ must have a much higher value than capacitor $C_2$ in order for the current needed to recharge $C_2$ would not have a significant impact on the voltage of capacitor $C_1$ and thereby on reference voltages $U_{ref1}$ and $U_{ref2}$. Alternatively, voltage drop in capacitor $C_1$ can be prevented by buffering the voltage acting across the capacitor by connecting a suitable operational amplifier or some other voltage follower.

At time instant $t_{02}$ switch reference $SW_{a\_ref}$ is reset to zero and, at the same time, transistor T2 is made non-conductive (G2=0). After this, phase voltage $U_a$ begins to drop, causing the capacitor $C_2$ to discharge in accordance with time constant $RC_2$. At time instant $t_2$ voltage $U_{C2}$ drops below the higher reference voltage $U_{ref2}$ and thus output S2 of comparator M2 is reset to zero. In this case the following is valid for voltage $U_{ref2}$ $$U_{ref2} = kU_{DC} - \frac{1}{C_2}\int_{t_{02}}^{t_2}\frac{U_{C2}-kU_a}{R}dt \tag{5}$$

When the second resistance $R_2$, third resistance $R_3$, and fourth resistance $R_4$ as well as the second capacitor $C_2$ are selected such that $kU_{DC}-U_{ref2} \ll kU_{DC}$ and $RC_2 \gg t_2-t_{02}$ and phase voltage changes during time interval $t_{02} \ldots t_2$, capacitor voltage can be approximated by constant value $kU_{DC}$ to calculate the integral of equation (5), because the capacitor voltage decreases considerably slower than the phase voltage. The approximation equation (5) thus yields the following:

$$U_{ref2} = kU_{DC} - \frac{1}{C_2}\int_{t_{02}}^{t_2}\frac{kU_{DC}-kU_a}{R}dt = \left(1-\frac{t_2-t_{02}}{RC_2}\right)kU_{DC} + \frac{k}{RC_2}\int_{t_{02}}^{t_2}U_a dt$$

In other words, the phase voltage integral for time interval $t_{02} \ldots t_2$ is $$\int_{t_{02}}^{t_2}U_a dt = \frac{RC_2}{k}U_{ref2} - (RC_2 - (t_2-t_{02}))U_{DC}$$

Assume that the ideal voltage pulse corresponding to a real phase voltage and having an amplitude equal to DC voltage ends at time instant $t_{c2}$ (the broken line in FIG. 5). In order for the areas of the ideal and the real voltage pulse to be the same also during time interval $t_{02} \ldots t_2$, the following must be valid for time instant $t_{c2}$ $$U_{DC}(t_{c2}-t_{02}) = \int_{t_{02}}^{t_2}U_a dt = \frac{RC_2}{k}U_{ref2} - (RC_2 - (t_2-t_{02}))U_{DC},$$

which yields the following for time instant $t_{c2}$:

$$t_{c2} = t'_2 + \frac{RC_2}{k}\frac{U_{ref2}}{U_{DC}} - RC_2 = t_2 - \frac{R_2}{R_2+R_3+R_4}RC_2 \tag{6}$$

On the basis of equations (4) and (6), the length of the ideal voltage pulse is thus expressed as follows:

$$t_{c2} - t_{c1} = t_2 - t_1 - \frac{R_2 - R_4}{R_2+R_3+R_4}RC_2, \tag{7}$$

and thereby the length of the ideal voltage pulse can be calculated in accordance with the method and arrangement of the invention on the basis of time instants $t_1$ and $t_2$ and a constant term dependent on the choice of reference voltages.

In practice it is sensible to select reference voltages $U_{ref1}$ and $U_{ref2}$ so that $U_{ref1}=kU_{DC}-U_{ref2}$, which means that resistances $R_2$ and $R_4$ must be equal. In that case the term dependent on the component values of FIG. 3 disappears from equation (7), thus yielding $$t_{c2}-t_{c1}=t_2-t_1 \tag{8}$$

In other words, the length of an ideal voltage pulse equal in magnitude to DC voltage and having an area equal to that of a real voltage pulse, can be calculated by a comparison of a low-pass filtered voltage according to the circuit shown in FIG. 3. The length thus obtained for the low-pass filtered voltage pulse corresponds to that of the ideal voltage pulse, i.e. average phase voltage can be calculated directly from the following equation:

$$U_{a\_ave} = \frac{t_2-t_1}{T}U_{DC}, \tag{9}$$

where T is one modulation sequence of phase a containining the voltage pulse in question.

In practice the calculation of the phase voltage average is most preferably based on equation (9), and therefore the method disclosed here does not necessarily require any changes to algorithms typically used in motor control. Consequently, instead of using conventional comparison based on instantaneous phase voltage values, time instants $t_1$ and $t_2$ are determined in the invention by means of the circuit shown in FIG. 3. In other words, these time instants determined according to the invention are used for replacing time instants previously determined from instantaneous phase voltage values.

FIG. 3 illustrates the use of timing logic 31 to control switches T1 and T2 for initialising capacitor $C_2$. The timing logic receives as inputs switch reference $SW_{a\_ref}$ and outputs S1 and S2 from comparator members M1 and M2, respectively. In the following, the timing logic will be described in greater detail with reference to FIGS. 3 and 4 for the duration of one pulse. At time instant $t_{01}$ switch reference $SW_{a\_ref}$ controlling the phase output switch component switches to the high state, timing logic 31 thus switching its output G1 to the low state, thereby bringing switch T1 to a blocking mode. As a result, the rising voltage of the phase output starts to recharge capacitor $C_2$. The voltage in capacitor $C_2$ rises and exceeds the first reference voltage $U_{ref1}$, whereby comparator M1 switches its output S1 to the high state. In FIG. 3, this moment when the voltages are exceeded is indicated by a first time instant $t_1$.

When the timing logic detects that signal S1 rises, it switches its output G2 to the high state after a brief delay. In output G2 in the high state controls switch T2 to a conductive state, whereby capacitor $C_2$ is recharged with voltage $kU_{DC}$. As capacitor $C_2$ is being recharged, its voltage exceeds the second reference voltage $U_{ref2}$ as well, and therefore also output S2 of comparator M2 is switched to the high state.

Next, at time instant $t_{02}$ switch reference $SW_{a\_ref}$ switches to the low state and controls the switch of the output of phase a accordingly. When the timing logic detects that the change in the state of the switch reference, it uses its output G2 to control switch component T2 to a blocking mode, thereby causing voltage $U_{C2}$ of capacitor $C_2$ to start to decrease. When the capacitor is discharged so that voltage $U_{C2}$ drops below the second reference voltage $U_{ref2}$, the second comparator M2 moves to a lower state. In FIG. 4 this takes place at the second time instant $t_2$. When the timing logic detects this change, it switches its output G1 to the high state after a little while, thereby controlling switch T1 to discharge the charging of capacitor $C_2$. As voltage $U_{C2}$ of capacitor $C_2$ drops below the first reference voltage $U_{ref1}$, output S1 of comparator M1 switches to the low state. The timing logic is thus ready to function in a corresponding manner in connection with the next pulse.

FIG. 3 further shows a pulse length measuring block 32. This measuring block reveives as input outputs S1 and S2 of comparator M1 and M2, respectively. The measuring block calculates the difference between time instants $t_1$ and $t_2$, i.e. time $t_2-t_1$ between the rising edge of signal S1 (=$t_1$) and the falling edge of signal S2 (=$t_2$).

FIG. 3 further shows block 33 that calculates average phase voltage $U_{a\_ave}$ in the manner already described.

It is to be noted that the circuit shown in FIG. 3 is only one example and could be replaced by switching based on operational amplifiers, for example, to implement the same idea. The transistors needed for initializing capacitor $C_2$ and their control logic could be left out as well, provided that a sufficiently short time constant $RC_2$ can be selected in relation to a minimum pulse duration. However, in an optimal situation the time constant should be such that the capacitor voltage does not reach reference voltage $U_{ref1}$ or $U_{ref2}$ until the phase voltage has already assumend its permanent state value.

Figure 7:
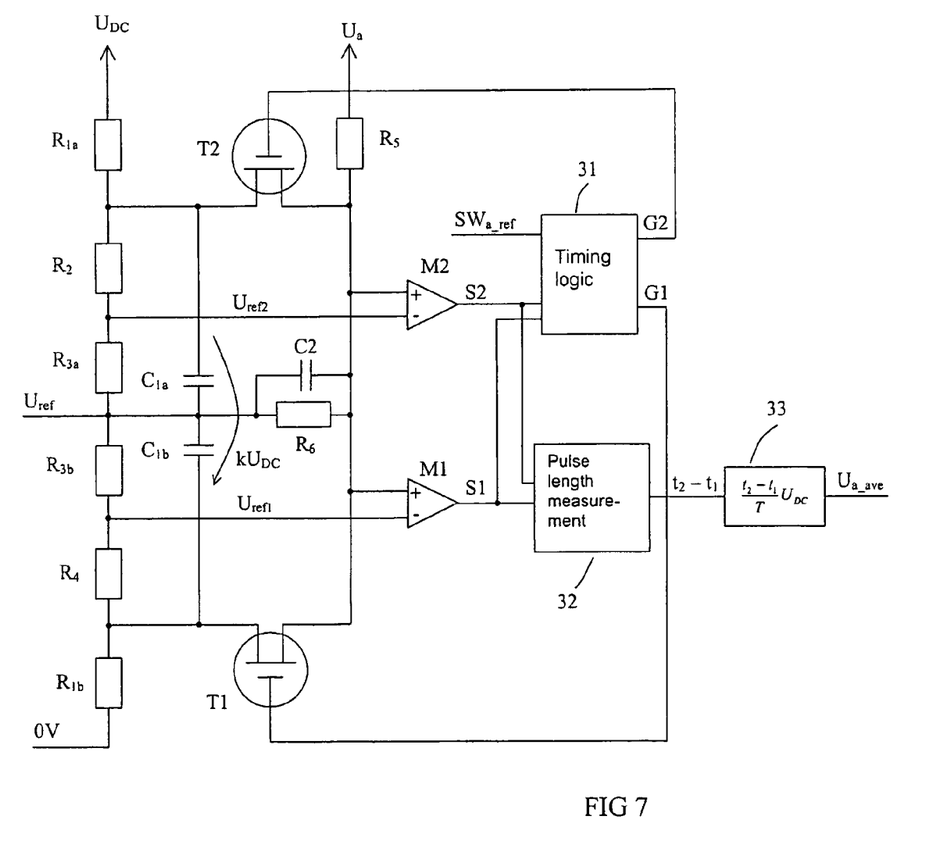
FIG. 7 illustrates an alternative embodiment of circuit that implements the method of the invention.

The measurements according to the embodiment of FIG. 3 are carried out at the lower voltage level potential of the intermediate voltage circuit. However, it is obvious that the measurement can also be carried out at an arbitrary potential between $U_{ref2}-U_{ref1} \ldots U_{dc}-(U_{ref2}-U_{ref1})$. FIG. 7 shows an embodiment in which the measurement takes place at potential $U_{ref}$ different from the lower potential of the intermediate circuit. Unlike in FIG. 3, in the embodiment of FIG. 7 resistances $R_1$ and $R_3$ and capacitor $C_1$ are divided in two: $R_{1a}$, $R_{1b}$ and $R_{3a}$ and $R_{3b}$ and $C_{1a}$ and $C_{1b}$, respectively.

When the selected measurement potential $U_{ref}=U_{dc}/2$, the following divided resistance values are obtained in relation to FIG. 3:

$$R_{1a}=R_{1b}=R_1/2$$

$$R_{3a}=R_{3b}=R_3/2$$

Figure 6:
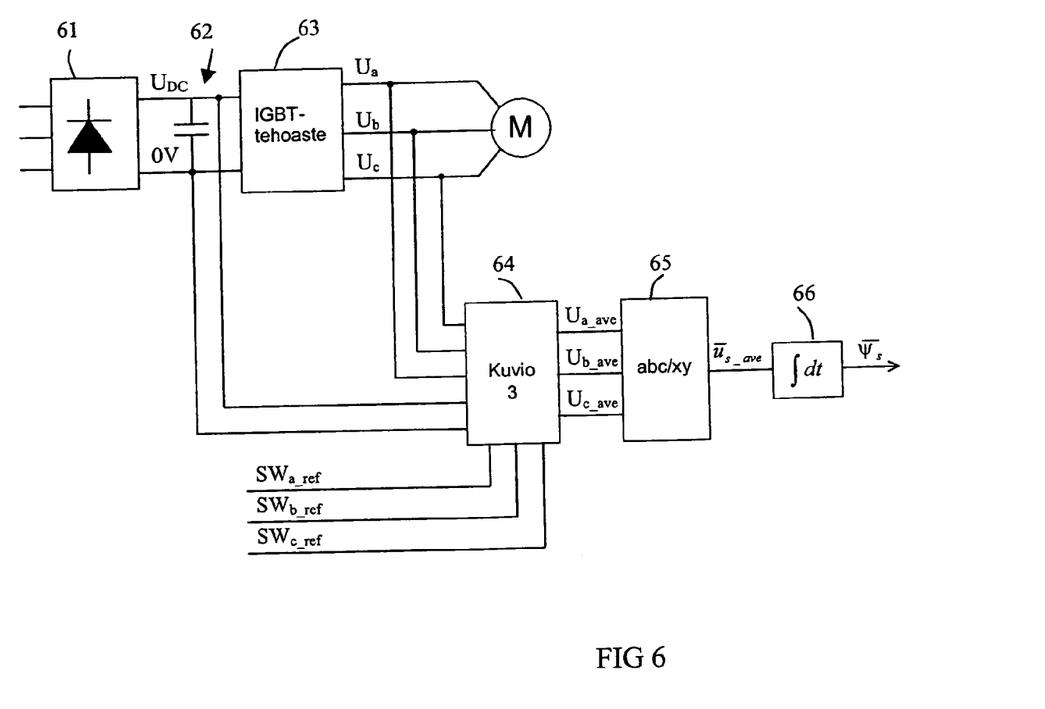
FIG. 6 illustrates a typical circuit in connection with which the invention is applied.

Capacitor values, in turn, can be selected such that $C_{1a}=C_{1b}=C_1$, for example. As stated above, measurement potential $U_{ref}$ can be chosen arbitrarily within the limits given above. Naturally the magnitudes of the resistances in the resistance chain performing the voltage division are to be selected as required by the measurement potential to be used. For example, it is possible to produce a measurement potential of a specific fixed value in relation to the upper and lower potential of the intermediate voltage circuit by using a separate voltage controller. A more detailed disclosure of the switching illustrated in FIG. 7 is not necessary, because the essential elements of the operation correspond to those disclosed in connection with FIG. 3. FIG. 6 shows the arrangement in its typical surroundings, i.e. as a part of a controller circuit of a frequency converter arranged to control a motor. The Figure is a schematic view of a rectifier part 61, DC voltage circuit 62, and output switch components, i.e. an inverter part 63, of a frequency converter. The Figure further shows how the circuitry of FIG. 3 or FIG. 7 is arranged into block 64. It is to be noted that the block comprises a separate circuitry, shown in FIG. 3 or FIG. 7, for each three phases. Consequently, block 64 receives as input switch references $SW_{a\_ref}$, $SW_{b\_ref}$, $SW_{c\_ref}$ of each phase, upper $U_{DC}$ and lower 0V voltage levels of the intermediate DC voltage circuit, and output phase voltage $U_a$, $U_b$, $U_c$ of each frequency converter. According to the invention these starting values are used for calcutating average phase voltage $U_{a\_ave}$, $U_{b\_ave}$, $U_{c\_ave}$ for each phase.

FIG. 6 further shows how the average phase voltages are used for forming a space vector $\bar{u}_{s\_ave}$ by means of block 65, this space vector being further integrated by means of integration block 66 to form flux vector $\bar{\psi}_s$. It is to be noted that FIG. 6 does not show that typically, before the phase voltage vector is integrated to form the flux vector, stator resistance voltage loss is subtracted from the voltage. This flux vector can be further used for control purposes as it provides accurate data on the electric state of the electric machine to be controlled. Due to the method and arrangement of the invention a more accurate voltage integral than before and thereby more reliable machine control is achieved.

It is apparent to a person skilled in the art that the basic idea of the invention can be implemented in various ways. The invention and its embodiments are therefore not restricted to the above examples but may vary within the scope of the claims.

The invention claimed is:

1. A method for determining the effective time of a voltage pulse of phase voltage generated by a frequency converter provided with an intermediate voltage circuit, the voltage pulses of the phase voltage being generated from upper and lower voltage levels of the intermediate voltage circuit, the voltage levels showing a difference in potential, comprising the steps of:

generating a comparison voltage from the voltage of the intermediate voltage circuit by scaling the voltage of the intermediate voltage circuit to a lower voltage by means of a scaling coefficient;

generating a first reference voltage and a second reference voltage, the first reference voltage being lower than the second reference voltage, and the second reference voltage being lower than the comparison voltage;

scaling the phase output voltage by means of the scaling coefficient;

switching the phase output to the higher voltage level of the intermediate voltage circuit;

low-pass filtering the scaled phase output voltage to generate a low-pass filtered phase output voltage;

comparing the low-pass filtered phase output voltage with the first reference voltage when the voltage pulse of the phase output rises from the lower voltage level of the intermediate voltage circuit;

detecting a first time instant when the low-pass filtered phase output voltage exceeds the first reference voltage;

switching the phase output to the lower voltage level of the intermediate voltage circuit;

comparing the low-pass filtered phase output voltage with the second reference voltage when the voltage pulse of the phase output drops from the upper voltage level of the intermediate voltage circuit;

detecting a second time instant when the low-pass filtered phase output voltage is lower than the second reference voltage; and calculating the effective time of the voltage pulse on the basis of the time between the first and the second time instants and a constant term the magnitude of which is determined by the magnitudes of the reference voltages, the effective time thus determining the length of an ideal pulse corresponding to the output voltage pulse, having an amplitude corresponding to that of the difference in potential in the intermediate circuit, and having infinitely fast rise and fall times.

2. A method according to claim 1, wherein the method comprises a phase in which the magnitude of the first reference voltage is selected such that it is equal to the difference between the comparison voltage and the second reference voltage, whereby the constant term is zero.

3. A method according to claim 1, wherein the generating of the comparison voltage from the voltage of the intermediate voltage circuit comprises a phase in which the comparison voltage is generated by means of a resistive voltage division circuit.

4. A method according to claim 1, wherein the generating of the first and the second reference voltages comprises phases in which the reference voltages are generated in connection with the generating of the comparison voltage by means of a resistive voltage division circuit.

5. A method according to claims 1, wherein the scaling of the phase output voltage comprises a phase in which the phase output voltage is scaled by means of a resistive voltage division circuit.

6. A method according to claim 1, wherein, before the phase output is connected to a higher voltage of the intermediate voltage circuit, the low-pass filter is initialised by setting its voltage to correspond to the lower voltage of the intermediate voltage circuit.

7. A method according to claim 1, wherein, before the phase output is connected to a lower voltage of the intermediate voltage circuit, the low-pass filter is initialised by setting its voltage to correspond to the comparison voltage.

8. An arrangement for determining the effective time of a voltage pulse of phase voltage generated by a frequency converter provided with an intermediate voltage circuit, the voltage pulses of the phase voltage being generated from the upper and lower voltage levels of the intermediate voltage circuit, the voltage levels showing a difference in potential, comprising:
means for generating a comparison voltage from the voltage of the intermediate voltage circuit by scaling the voltage of the intermediate voltage circuit to a lower voltage by means of a scaling coefficient;
means for generating a first reference voltage and a second reference voltage, the first reference voltage being lower than the second reference voltage, and the second reference voltage being lower than the comparison voltage;
means for scaling the phase output voltage by means of the scaling coefficient;
means for switching the phase output alternately to the higher voltage level and the lower voltage level of the intermediate voltage circuit; means for low-pass filtering the scaled phase output voltage to generate a low-pass filtered phase output voltage;
means for comparing the low-pass filtered phase output voltage with the first reference voltage;
means for detecting a first time instant when the low-pass filtered phase output voltage exceeds the first reference voltage;
means for comparing the low-pass filtered phase output voltage with the second reference voltage;
means for detecting a second time instant when the low-pass filtered phase output voltage is lower than the second reference voltage; and
means for calculating the effective time on the basis of the time between the first and the second time instants and a constant term the magnitude of which is determined by the magnitudes of the reference voltages, the effective time thus determining the length of an ideal pulse corresponding to the output voltage pulse, having an amplitude corresponding to that of the difference in potential in the intermediate circuit, and having infinitely fast rise and fall times.

9. An arrangement according to claim 8, wherein the means for generating the comparison voltage from the voltage of the intermediate voltage circuit comprise a resistive voltage division circuit connected between the upper and lower voltage levels of the intermediate voltage circuit, the comparison voltage being arranged to be generated at a point between the first and the second resistances, the resistance being in a sequential order in a series consisting of a first resistance, second resistance, third resistance, and fourth resistance, the first resistance being connected to a higher voltage of the intermediate voltage circuit and the fourth resistance being connected to a lower voltage of the intermediate voltage circuit.

10. An arrangement according to claim 8, wherein the means for generating the first and the second reference voltages comprise a resistive voltage division circuit connected between the upper and lower voltage levels of the intermediate voltage circuit, the first reference voltage being arranged to be generated at a point between the third and the fourth resistance, and the second reference voltage at a point between second and the third resistance.

11. An arrangement according to claim 10, wherein the second and the fourth resistance are equal in magnitude, whereby the constant term is zero and the length of the ideal pulse is equal to the time between the first and the second time instant.

12. An arrangement according to claim 8, wherein the means for scaling the phase output voltage comprise a resistive voltage division circuit connected between the phase output and the lower voltage phase of the intermediate voltage circuit, the fifth resistance being connected to the phase output and the scaled phase voltage thus being arranged to be generated at a point between the fifth resistance and the sixth resistance.

13. An arrangement according to claim 8, wherein the scaling coefficient is composed of the relationships between the resistances so that $$k = \frac{R_2 + R_3 + R_4}{R_1 + R_2 + R_3 + R_4} = \frac{R_6}{R_5 + R_6}.$$

14. An arrangement according to claim 8, wherein the means for low-pass filtering the scaled phase output voltage comprise a capacitor connected in parallel with the sixth resistance, the low-pass filtered phase output voltage being thus generated across the capacitor.

15. An arrangement according to claim 8, wherein the means for comparing the low-pass filtered phase output voltage with the first reference voltage and the means for detecting the first time instant comprise a first comparator member whose first input is connected to the first reference voltage and whose second input is connected to the low-pass filtered phase voltage, the output of the comparator member being arranged to change its output state when the low-pass filtered phase output becomes greater than the first reference voltage and to thereby detect the first time instant.

16. An arrangement according to claim 8, wherein the means for comparing the low-pass filtered phase output voltage with the second reference voltage and the means for detecting the second time instant comprise a second comparator member whose first input is connected to the second reference voltage and whose second input is connected to the low-pass filtered phase output, the output of the comparator member being arranged to change its output state when the low-pass filtered phase output drops below the reference voltage and to thereby detect the second time instant.

17. An arrangement according to claim 8, wherein the arrangement further comprises means for initialising the low-pass filter, before the phase output is connected to a higher voltage of the intermediate voltage circuit, by setting the voltage of the low-pass filter to correspond to a lower voltage of the intermediate voltage circuit.

18. An arrangement according to claim 8, wherein the arrangement further comprises means for initialising the low-pass filter, before the phase output is connected to a higher voltage of the intermediate voltage circuit, by setting the voltage of the low-pass filter to correspond to the comparison voltage.

19. An arrangement according to claim 17, wherein the means for initialising the low-pass filter comprise a switch component and a timing logic arranged to control it, the switch component being configured to discharge the charging of the capacitor and the timing logic being responsive to the phase output switch reference.

20. An arrangement according to claim 18, wherein the means for initialising the low-pass filter comprise a switch component and a timing logic arranged to control it, the switch component being configured to charge the capacitor to the comparison voltage and the timing logic being responsive to the phase output switch reference.

21. An arrangement according to claim 8, wherein the arrangement further comprises a pulse length measuring circuit responsive to the first and the second time instant for calculating the different between them.

* * * * *